United States Patent
Shibata et al.

(10) Patent No.: US 12,505,542 B2
(45) Date of Patent: Dec. 23, 2025

(54) THRESHOLD DETERMINATION METHOD

(71) Applicant: SCREEN HOLDINGS CO., LTD., Kyoto (JP)

(72) Inventors: Saya Shibata, Kyoto (JP); Hiroshi Ogi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 387 days.

(21) Appl. No.: 18/276,535

(22) PCT Filed: Feb. 3, 2022

(86) PCT No.: PCT/JP2022/004247
§ 371 (c)(1),
(2) Date: Aug. 9, 2023

(87) PCT Pub. No.: WO2022/172852
PCT Pub. Date: Aug. 18, 2022

(65) Prior Publication Data
US 2023/0419483 A1    Dec. 28, 2023

(30) Foreign Application Priority Data
Feb. 12, 2021    (JP) .................................. 2021-020829

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10056* (2013.01); *G06T 2207/30024* (2013.01)

(58) Field of Classification Search
None
See application file for complete search history.

(56) References Cited

U.S. PATENT DOCUMENTS

| | | | |
|---|---|---|---|
| 10,937,162 B2* | 3/2021 | Sarkar | G06T 7/0014 |
| 2010/0303809 A1 | 12/2010 | Bacus | |
| 2021/0073513 A1* | 3/2021 | Porto | G06T 7/136 |

FOREIGN PATENT DOCUMENTS

| | | |
|---|---|---|
| GB | 2414074 A | 11/2005 |
| JP | 2010-500573 A | 1/2010 |

(Continued)

OTHER PUBLICATIONS

International Search Report issued in corresponding International Patent Application No. PCT/JP2022/004247, dated Apr. 26, 2022, with English translation.

(Continued)

*Primary Examiner* — Darryl V Dottin
(74) *Attorney, Agent, or Firm* — Rimon P.C.

(57) ABSTRACT

A threshold determination method includes a region specification step of specifying cell regions corresponding to individual cells in an image obtained by imaging the biological specimen, a determination step of setting temporarily a threshold for staining density quantitatively indicating the degree of staining of the cell region, comparing the staining density and the threshold for each of the cell regions and determining whether a stained state is positive or negative for staining, a receiving step of displaying a determination result of the stained state of each of the cell regions and receiving an operation input of a user to change the determination result for each cell region, and a resetting step of resetting the threshold in accordance with the determination result after change. It is possible to optimize effectively a threshold used in determining a stained state from an image of an immunohistostained specimen while human judgment is made.

11 Claims, 10 Drawing Sheets

(56) References Cited

FOREIGN PATENT DOCUMENTS

| | | |
|---|---|---|
| JP | 2010-252648 A | 11/2010 |
| JP | 6187989 B2 | 8/2017 |
| JP | 2019-513255 A | 5/2019 |
| WO | 2008/019299 A2 | 2/2008 |
| WO | 2013/164280 A1 | 11/2013 |
| WO | 2016/027542 A1 | 2/2016 |
| WO | 2017/151799 A1 | 9/2017 |

OTHER PUBLICATIONS

Extended European Search Report dated Dec. 3, 2024, from corresponding European Application No. 22752679.5, 9 pages.
Geread, R.S. et al. "IHC Color Histograms for Unsupervised Ki67 Proliferation Index Calculation", Frontiers in Bioengineering and Biotechnology, Oct. 1, 2019, vol. 7, Article 226, 20 pages.

* cited by examiner

F I G. 5A
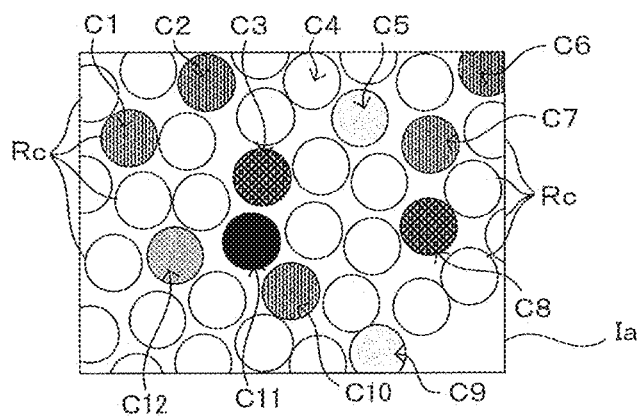
F I G. 5B
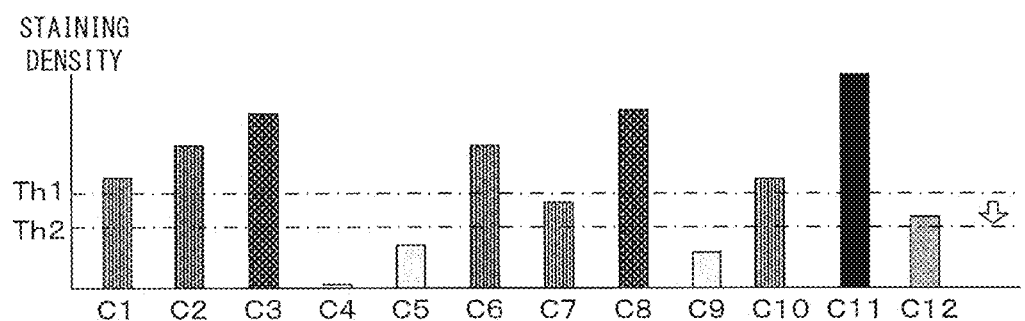

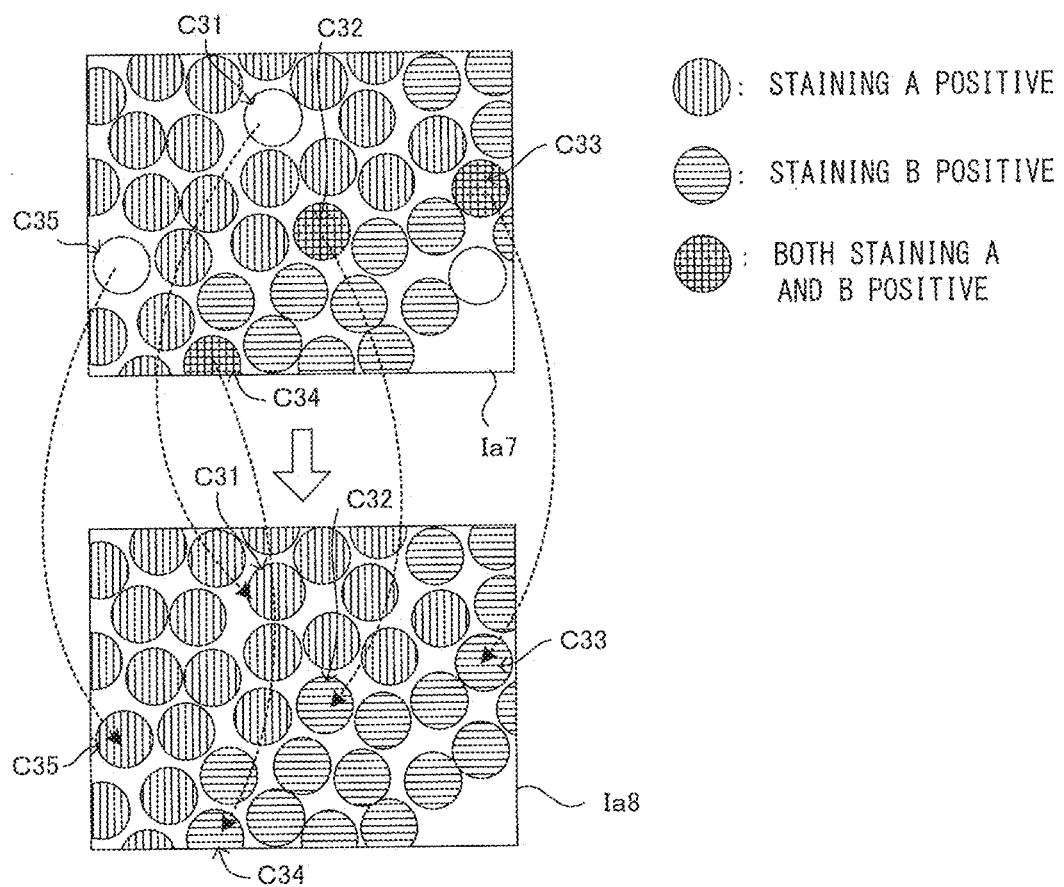

THRESHOLD DETERMINATION METHOD

CROSS REFERENCE TO RELATED APPLICATIONS

This application is the U.S. National Phase under 35 U.S.C. § 371 of International Application No. PCT/JP2022/004247, filed on Feb. 3, 2022, which claims the benefit of Japanese Application No. 2021-020829, filed on Feb. 12, 2021, the entire contents of each are hereby incorporated by reference.

TECHNICAL FIELD

This invention relates to a method for determining a threshold in evaluating a stained state of a stained biological specimen by an image analysis.

BACKGROUND ART

In research fields of medicine and biology, biological specimens such as tissue specimens and cell specimens are analyzed in single cells for the purpose of elucidating a disease mechanism and a biological mechanism, elucidating a drug action mechanism and the like. In these analyses, biological materials such as proteins and RNAs (ribonucleic acids) are stained by various staining methods. By evaluating stained states of cells, specifically whether or not the cells are positive or negative for the staining, quantitative or qualitative analyses are conducted. This evaluation result possibly includes artifacts such as noise during measurement and a staining variation due to a staining technique. Thus, to conduct a biologically significant analysis, an analysis method not affected by such artifacts is necessary.

In flow cytometry, which is one technique of a single cell analysis, a non-specific antigen-antibody reaction is judged, for example, using an isotype control and a threshold for positive or negative determination is manually determined (see, for example, patent literature 1). On the other hand, in image cytometry using a tissue specimen, a method for automatically determining a threshold from image information, a method for optimizing a threshold in stages by a manual operation, a method for reducing artifacts from specimen and cell data to be controlled and the like have been proposed (see, for example, patent literature 2, 3).

CITATION LIST

Patent Literature

[PTL 1] Japanese Patent No. 6187989
[PTL 2] JP2010-500573A
[PTL 3] JP2019-513255A

SUMMARY OF INVENTION

Technical Problem

If a tissue specimen is an object to be directly evaluated, there are a wide variety of factors of artifacts unlike flow cytometry using specimens divided into cells in advance. Thus, for threshold optimization, judgment by the skilled person's subjectivity and adjustment are necessary in many cases. However, a huge number of cells are included in a tissue specimen, and an optimal threshold is not necessarily unique, but variable depending on a state of the specimen and imaging. Further, in a situation in which a plurality of types of immunohistostaining (immunohistochemistry) are sequentially applied to the same specimen to analyze a multitude of biological substances (called multiple immunostaining), a possibility of result mismatch, which could not occur in single staining, needs to be grasped.

From these, it cannot be said at present that an environment for efficiently performing an adjustment operation in optimizing a threshold while human judgment is made has been sufficiently established.

Solution to Problem

This invention was developed in view of the above problem and aims to provide a technique capable of efficiently optimizing a threshold used in determining a stained state from an image of an immunohistostained specimen while human judgment is made.

To achieve the above aim, one aspect of this invention is directed to a threshold determination method for evaluating a stained biological specimen, the threshold determination method including a region specification step of specifying cell regions corresponding to individual cells in an image to be processed obtained by imaging the biological specimen, a determination step of setting temporarily a threshold for a staining density which quantitatively indicates how densely the cell region is stained, comparing the staining density and the threshold for each of the cell regions and determining whether a stained state is positive or negative for the staining, a receiving step of displaying a determination result of the stained state of each of the cell regions and receiving an operation input of a user to change the determination result for each cell region, and a resetting step of resetting the threshold in accordance with the determination result after the change.

In the invention thus configured, the stained state of each of the cell regions extracted from the image to be processed, specifically whether the cell region is positive or negative for the staining, is automatically determined based on the threshold set in advance. However, since the threshold at this time is not necessarily an optimal value, the threshold is optimized by reflecting the judgment of a skilled person.

Specifically, the determination result of the stained state of each cell region based on the temporarily set threshold is displayed, and the operation input to change this is received from the user. In this way, the user can teach a correct determination for the cell region having an improper determination result represented therefor. By resetting the threshold according to thus taught result, the threshold can be corrected to approach the optimal value.

A method for making a threshold changeable and settable by a user, displaying a determination result based on the set threshold and letting the user evaluate the validity of the determination result is, for example, known as a threshold optimization method based on human judgment. However, in this method, the cell regions affected by the determination results appear at a multitude of positions in the image due to the change of the threshold. Thus, an operation of checking the presence or absence and the validity of such a change and converging the threshold to an optimal value becomes a large burden on the user.

In the invention, the user does not directly operate the threshold, but a correction input for the displayed determination result is received and the threshold is reset to correspond to that result. Thus, if the user finds out the determination result required to be corrected, the user only has to point it out and needs not confirm the results for all the cell regions. Therefore, an operation can be made significantly efficient, and a user burden therefor is also small.

Advantageous Effects of Invention

As described above, in the invention, a stained state is determined based on a temporarily set threshold for an image of a stained biological specimen, and that determination result is displayed. Then, an operation input from a user to change the determination result is received, and the threshold is reset according to the received operation input. In this way, the threshold for determining the stained state can be efficiently optimized while human judgment is made.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF DRAWINGS

FIG. 5A is the diagram schematically showing an example of the determination result.

FIG. 5B is the diagram schematically showing an example of the determination result.

FIG. 7C is a diagram showing the principle of the threshold determination process in which a plurality of specimen images are combined.

DESCRIPTION OF EMBODIMENTS

Figure 1:
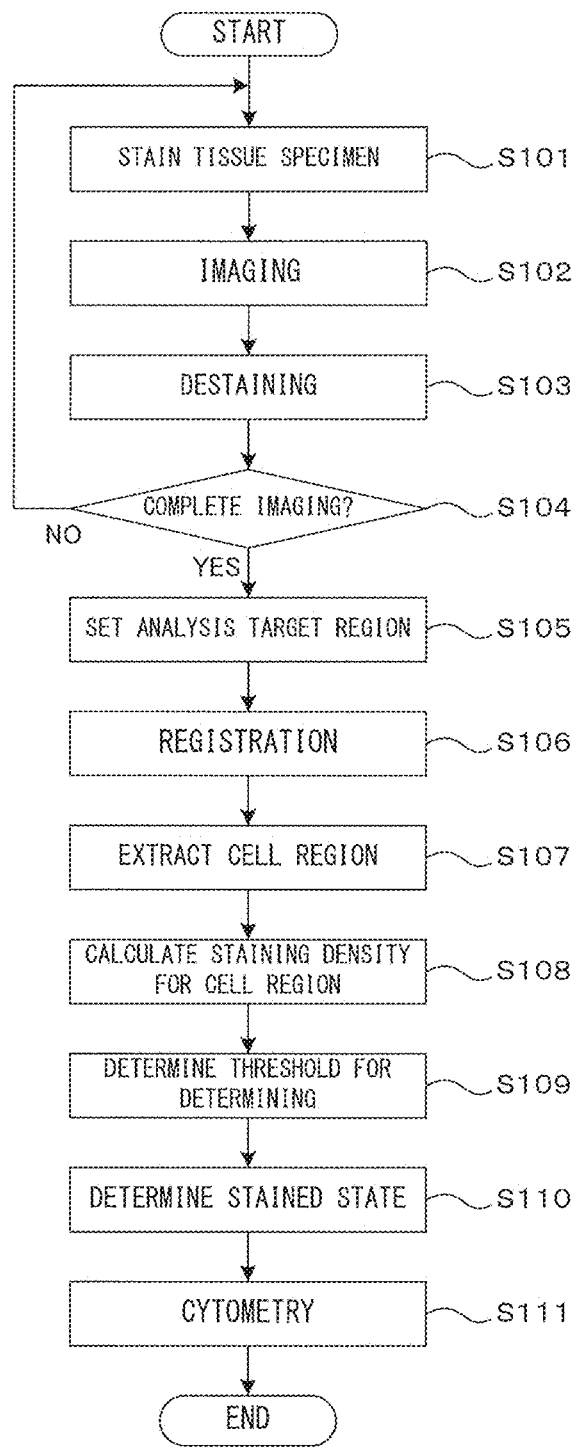
FIG. 1 is a flow chart showing a specimen analysis method, to which a threshold determination method according to the invention is applied.

FIG. 1 is a flow chart summarizing a specimen analysis method, to which a threshold determination method according to the invention is applicable. This specimen analysis method is a method for obtaining various pieces of quantitative information by imaging a multiple immunostained tissue specimen and analyzing that image, i.e. performing so-called image cytometry.

First, a specimen image to be processed is collected. Specifically, the tissue specimen to be analyzed is stained by a predetermined staining method (Step S101), and digital image data is obtained by imaging this tissue specimen (Step S102). The tissue specimen after imaging is destained (Step S103). This operation is repeated until imaging is completed for all of a plurality of types of staining methods prepared in advance (Step S104). In this way, a plurality of specimen images corresponding to the plurality of types of staining are collected. These specimen images are images obtained by imaging the same tissue specimen having mutually different types of staining applied thereto.

Subsequently, a part of the tissue specimen is set as an analysis target region to be analyzed (Step S105). Then, a partial image corresponding to the analysis target region is cut out as an analysis target image from each tissue specimen. Registration is performed for those analysis target images such that positions corresponding to each other coincide (Step S106).

Further, cell regions corresponding to cells in the tissue are extracted from each analysis target image (Step S107). Various methods are known as a method for extracting cell regions from an image. Also in this embodiment, an appropriate one can be selected from such known methods and applied. For example, it is possible to adopt a method for inputting analysis target images to a learning model, artificial intelligence or the like obtained by learning various stained images as teacher images in advance using an appropriate learning algorithm. By doing so, the cell regions can be extracted from this image. Further, it is, for example, possible to adopt a method for distinguishing cell regions and other regions by an image binarization processing using an appropriate threshold, a method for specifying the contours of cells by edge extraction or the like.

Note that, depending on the type and state of staining, the analysis target image may not be suitable for the extraction of the cell regions. For example, an analysis target image of a specimen in which specific structures in cells such as cell nuclei are selectively stained does not necessarily clearly show the outer shapes of the cells. Thus, such an image may not be suitable for application of specifying regions occupied by individual cells in an image. Even in such a case, an extraction result in an image of the specimen stained by another staining method for clearly showing the regions occupied by the cells can be utilized. That is, the respective stained images can be aligned in position by the registration processing (Step S106). Thus, regions corresponding to the cell regions extracted from one or more other stained images can be regarded as the cell regions in this analysis target image.

As just described, the cell regions in each analysis target image may be specified by a method for directly extracting the cell regions from this analysis target image by an imaging processing. Further, an indirect specification method may be adopted which regards regions corresponding to individual cell regions extracted using one or more images stained by another staining method as individual cell regions in this analysis target image.

Figure 2:
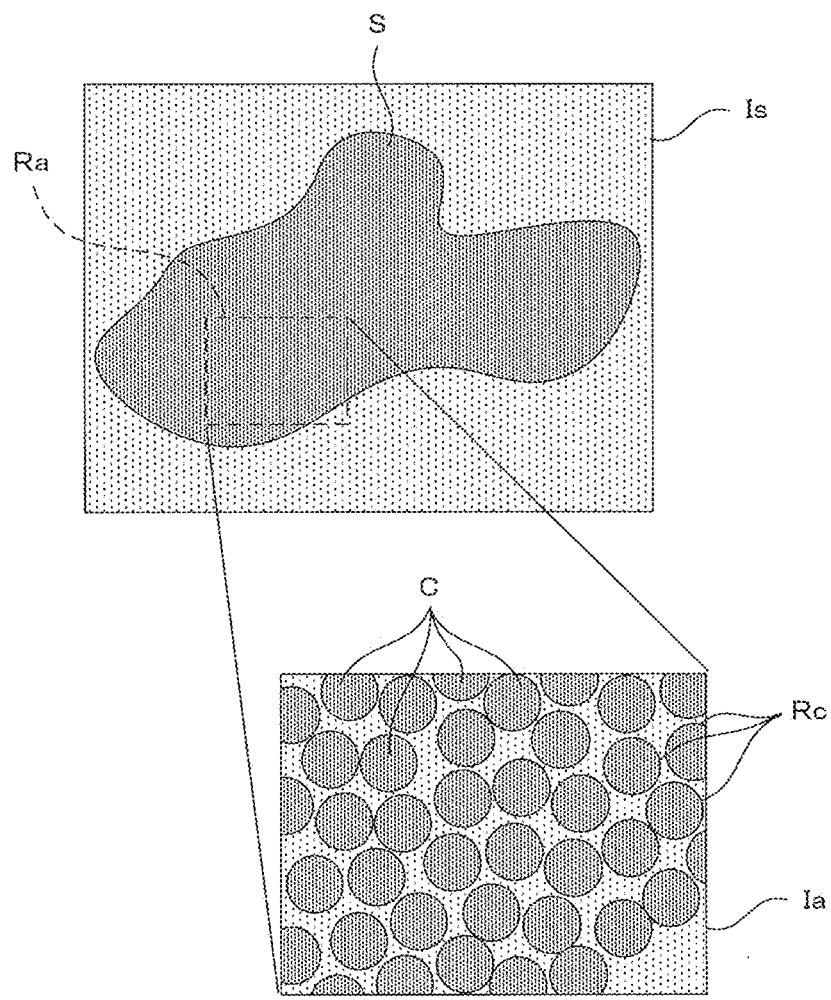
FIG. 2 is a diagram schematically showing an example of a specimen image.

FIG. 2 is a diagram schematically showing an example of a specimen image. A specimen image Is is an image including, as an object, at least a part of a tissue specimen S stained by an appropriate staining method after being obtained from a living organism or produced by culturing. Imaging can be performed, for example, by optical microscopic imaging. One specimen image Is is obtained for one type of staining.

A partial image corresponding to at least a partial region Ra to be analyzed, out of the specimen image Is, is cut out as an analysis target image Ia. The analysis target image Ia includes images of a plurality of cells C constituting a tissue. Cell regions Rc (FIG. 4) corresponding to the cells C are extracted by an appropriate image processing for region extraction. Here, the cells C are represented by circles of the same size for the sake of convenience. However, the sizes and shapes of cells differ and a plurality of types of cells are possibly included in an actual tissue. The purpose of this processing is to calculate quantitative information of these cells C such as the types, numbers, sizes, shapes, densities, distributions in the tissue of the cells C and quantities of specific substances.

Referring back to FIG. 1, at least one quantitative value associated with a staining density is calculated for each extracted cell region (Step S108). Various values quantitatively indicating how densely the cells or biological substances in the cells are stained are used as quantitative values. For example, an average density of the entire cell region, or a maximum density or average density of a region (e.g. a central part or outer peripheral part of the cell), in which a color corresponding to the staining is particularly strongly shown, in the cell region can be used as the quantitative value. In this way, how much the staining affects the individual cell region can be quantified. This value is referred to as a "staining density" below.

A threshold for determining stained states of the cells in the tissue for the staining is determined for each specimen image (Step S109). The "stained state" mentioned here is an index representing whether or not the cell is stained by the staining for one type of staining. Here, if the cell or the biological substance in the cell is stained by the staining and the staining density is a higher than a predetermined threshold, this cell is determined to be "positive" for this staining. On the other hand, if the staining density is lower than the threshold, the cell is determined to be "negative" for this staining. Step S109 is a processing for determining a threshold for this, and the threshold determination method of the invention is applied here. Specific processing contents are described later.

The stained state of each cell region is determined using the threshold determined in this way (Step S110). Further, cytometry is performed to obtain various pieces of quantitative information representing properties of each cell region (Step S111). Processing contents of the cytometry and types of quantitative information obtained thereby are arbitrary. Those pieces of information are used in various pathological diagnoses and researches together with the images of the tissue specimen. As just described, this embodiment belongs to an image cytometry technique for analysis in single cells without dividing a tissue specimen into individual cells.

In the case of individually analyzing the cells in the tissue specimen in this way, various artifacts affecting determination results such as staining variations, noise in imaging and the influence of surrounding cells and background density are possibly included. Thus, even if a threshold is automatically determined, for example, by a known image processing method used in the binarization process of images, that result is not necessarily an optimal value. That is, there is a possibility of erroneous determination such as "false-negative" of determining cells, which should be originally determined to be positive, as negative and, conversely, "false-positive" of determining cells, which should be originally determined to be negative, as positive due to improper setting of the threshold.

Accordingly, there is a room for subjectivity judgment by a user (skilled person) as to whether or not the determined threshold is proper. The threshold determination process of this embodiment is designed to enable an operation therefor to be efficiently performed while judgment by the user is made.

Figure 3:
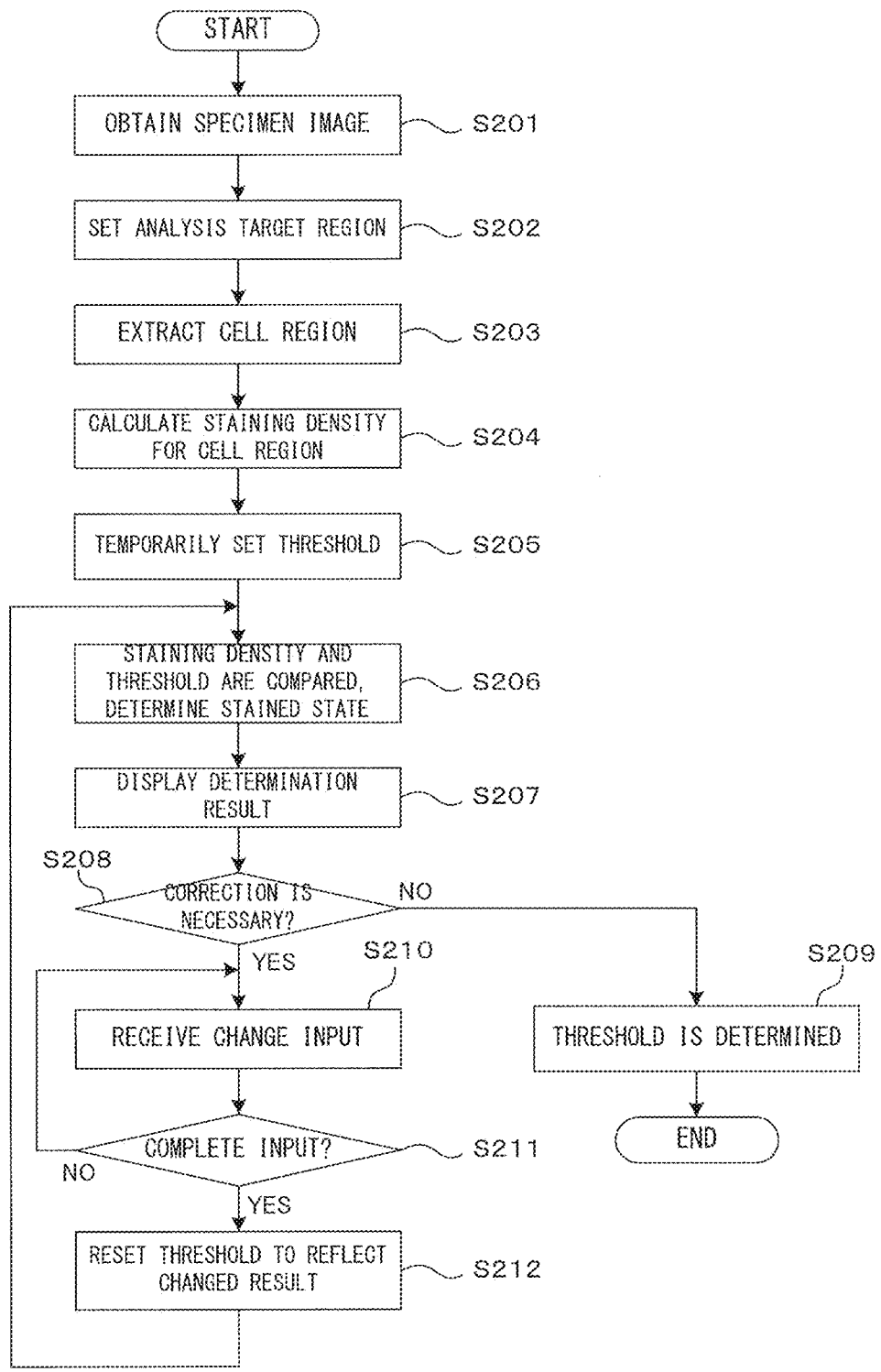
FIG. 3 is a flow chart showing the threshold determination process of this embodiment.

FIG. 3 is a flow chart showing the threshold determination process of this embodiment. This process is a process for reducing the influence of artifacts by optimizing the threshold which is set for the staining density to determine the stained state (positive/negative) of the cells. Note that this threshold determination process is performed for each of the plurality of types of staining. That is, the threshold is set for each specimen image captured using one type of staining. It is possible to simultaneously set thresholds for several types of staining in an actual process. However, a process for determining the threshold for one type of staining is first described to describe the principle below.

This process can be realized by a processing device having an appropriate arithmetic function such as a general-purpose computer device implementing a predetermined control program. An arithmetic processor having the arithmetic function, a receiver for receiving an operation input from a user and a display for displaying an image are required for the processing device for this purpose. A processing device having a general hardware configuration such as a personal computer can be, for example, used for image processings excluding the imaging of a specimen. Thus, the device configuration for performing this process is not described in detail here.

In this process, a specimen image Is for each type of staining is obtained (Step S201). An analysis target region Ra is set in that specimen image Is (Step S202) and an analysis target image Ia is cut out. Cell regions Rc are extracted from the cut-out analysis target image Ia (Step S203), and a staining density is calculated for each individual cell region (Step S204). These processings are basically the same as Steps S101 to S108 in FIG. 1, and results in Steps S101 to S108 can be directly used. That is, if the process of FIG. 1 is already started and the results in Steps S101 to S108 can be used, Steps S201 to S204 can be omitted. Conversely, Steps S110 to S111 may be performed by omitting Steps S105 to S108 and using results of Steps S201 to S204 performed as the threshold determination process of Step S109.

Figure 4:
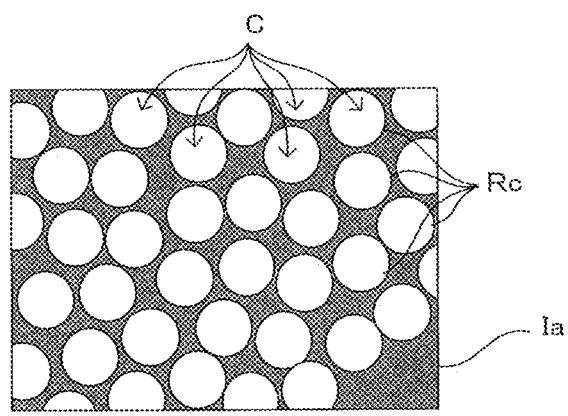
FIG. 4 is a diagram schematically showing an example of an extraction result of the cell regions.

FIG. 4 is a diagram schematically showing an example of an extraction result of the cell regions. As shown in FIG. 4, the analysis target image Ia is divided into cell regions Rc corresponding to the cells C and a surrounding background region. By producing a mask for division into the cell regions Rc and the other region in this way and applying this mask to the analysis target image Ia, only image contents in the cell regions Rc can be extracted. The following processing for quantification is performed for each of these cell regions Rc.

Referring back to FIG. 3, a suitable threshold is then temporarily set for the staining density (Step S205). By the comparison of the staining density, which is the quantitative value associated with the previously obtained density of each cell region Rc, and the threshold, the stained state of the individual cell, i.e. whether the cell is positive or negative for this staining, is determined (Step S206). Specifically, the staining density obtained for each cell region Rc and the set threshold are compared, and this cell region Rc is determined to be positive for this staining if the staining density is higher than the threshold. On the other hand, if the staining density is lower than the threshold, this cell region Rc is determined to be negative for this staining. If the staining density is equal to the threshold, the cell region Rc may be determined to be either positive or negative as long as determination criteria are fixed.

The threshold at this time is a temporarily set initial value. The initial value may be a value determined in advance or may be a value designated by the setting of the user. Further, a calculated threshold by analyzing an image by a known image processing algorithm used in image binarization such as a discriminant analysis method or Otsu's method may be applied as the initial value.

A determination result is displayed on an appropriate display device such as a display screen of a computer device, and presented to the user (Step S207). As illustrated next, the determination result is desirably displayed by superimposing visual information representing the determination result on the original analysis target image Ia. Further, the unprocessed original analysis target image Ia and an image representing the determination result may be displayed side by side.

Figure 5C:
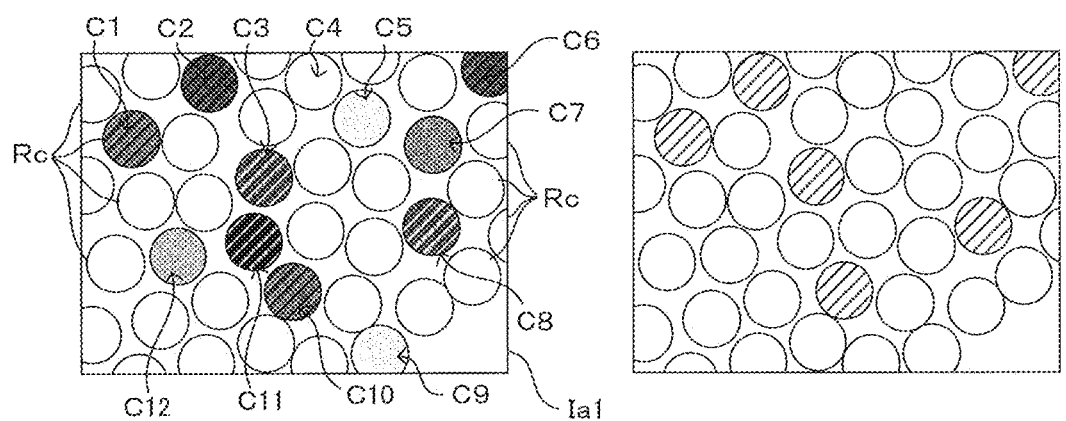
FIG. 5C is the diagram schematically showing an example of the determination result.

FIGS. 5A to 5D are diagrams schematically showing an example of the determination result. FIG. 5A is the diagram schematically showing an example of the analysis target image Ia. In the stained tissue specimen, the respective cells are stained at various densities. In the analysis target image Ia obtained by imaging this tissue specimen, the respective cell regions Rc have various luminances according to the staining densities of the cells. Any of the cells denoted by C1 to C12 in FIG. 5A is a cell stained at a density higher than a certain level, and FIG. 5B shows the staining densities of these cells in the form of a graph.

Note that circles denoted by C1, C2, etc. in each figure in FIG. 5A and subsequent figures are, strictly speaking, regions in the image where images corresponding to the cells C in the specimen S are present, i.e. the "cell regions" Rc. However, the cell regions in the image may be merely referred to as "cells" for the convenience of graphical representation and description unless distinction is particularly necessary.

Figure 5D:
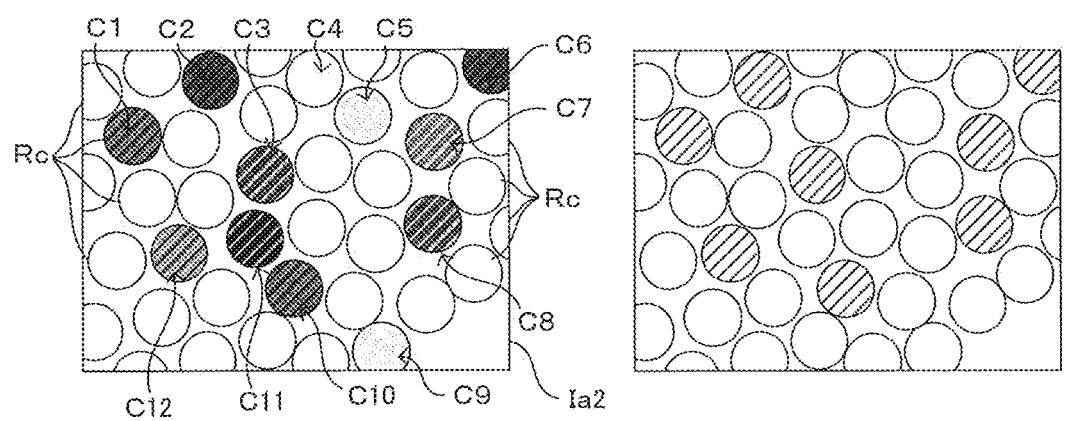
FIG. 5D is the diagram schematically showing an example of the determination result.

Here, the cell having a higher density than the threshold determined for the staining density is "positive", and the cell having a lower density than the threshold is "negative". FIGS. 5C and 5D schematically show examples in which the analysis target image Ia shown in FIG. 5A and an image having the cells determined to be positive superimposed and added by hatching on the analysis target image Ia by an imaging processing are placed side by side.

When the threshold is set to a value Th1 shown in FIG. 5B, the cells C1 to C3, C6, C8, C10 and C11 having the density higher than this threshold are determined to be positive. FIG. 5C corresponds to this state, and the respective cells listed here are hatched. Here, a left figure shows an image Ia1 in which hatching representing the determination results are superimposed on the original analysis target image Ia while the density information of the cells is retained, and a right figure shows only the contours of the cells and the determination results.

On the other hand, when the threshold is set to another value Th2 (<Th1), the cells C7, C12 are further determined to be positive in addition to the above cells. FIG. 5D corresponds to this state. Also here, a left figure shows an image Ia2 in which hatching representing the determination results is superimposed on the density information of the cells, and a right figure shows only the contours of the cells and the determination results.

In this way, the determination results change by changing the threshold, but such a change cannot be necessarily said to be the one easily intuitively known by the user. That is, for example, if the user manually changes the set value of the threshold, the determination results change accordingly. Such changes possibly appear in various ways at various positions in the image. Thus, it is not easily for the user to confirm those changes point by point and precisely judge in a short time whether or not the threshold is changed to approach an optimal value.

Accordingly, in this embodiment, the determination result for each cell is presented to the user by screen display. An input to change the determination result is received and the threshold is recalculated to reflect a result of the change. That is, the threshold is corrected teaching a correct determination by the user for the cell for which it was judged that the determination result was not proper and needed to be changed. In this way, the judgment of the user having a specialized knowledge can be reflected on the threshold. Further, only the determination for which a correction is thought to be necessary by viewing the image added with the determination results may be changed without directly operating the threshold. Thus, the user can perform an operation input based on more intuitive judgment.

Referring back to FIG. 3, specific processing contents are described. The determination results of the stained state (positive/negative) based on the current threshold are shown in the image displayed in Step S207. In this state, an operation input from the user is received. The operation input can be received from an appropriate input device such as a keyboard, a mouse or a touch panel.

If an operation input to the effect that no correction is necessary is received (NO in Step S208), the threshold at that time is determined as an optimal value (Step S209) and the threshold determination process is finished. On the other hand, if an input to change is made by the user, a correction is judged to be necessary (YES in Step S208). In this case, a change input is received (Step S210) until an intention to complete the input is given from the user (Step S211). If the change input by the user is completed (YES in Step S211), the threshold is reset to reflect the changed result (Step S212).

The stained state of each cell is determined again using the reset threshold (Step S206), and that result is displayed (Step S207). In this way, the user can confirm the determination results based on the newly set threshold. Then, in the same way as above, the processing of changing the determination results if necessary and resetting the threshold accordingly is repeated, whereby the threshold can be approximated to the optimal value.

A determination result display method, a specific mode of the change input by the user and a basic way of thinking of the resetting of the threshold are more specifically described. Note that an image similar to that in FIG. 5A or the like described above is used as an example of the analysis target image Ia to facilitate the understanding.

Figure 6A:
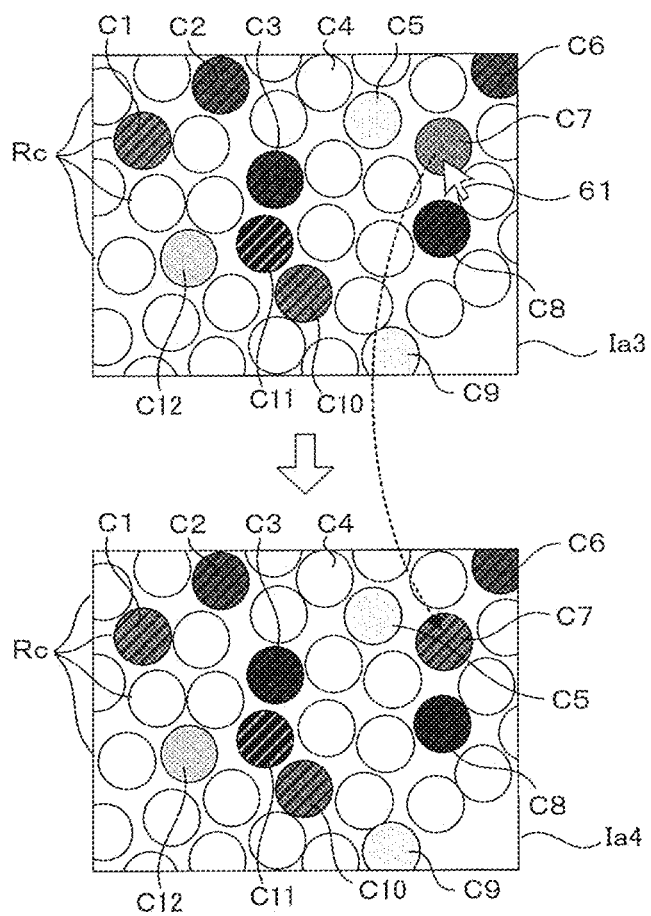
FIG. 6A is a diagram schematically showing an image representing determination results and an event of a change input.
Figure 6B:
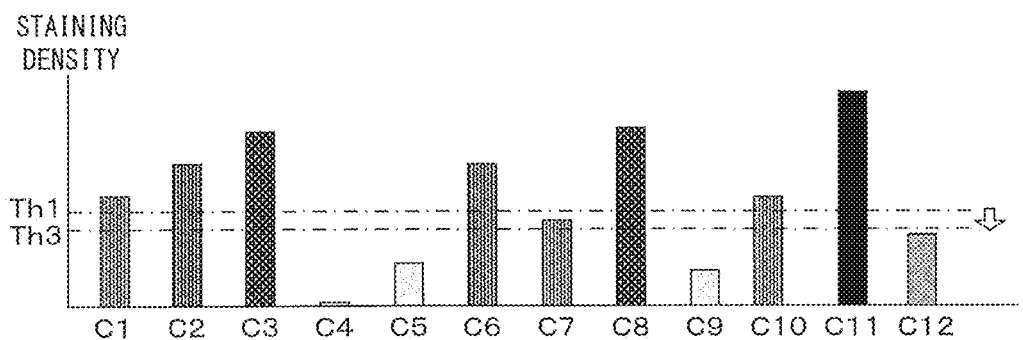
FIG. 6B is a diagram schematically showing an image representing determination results and an event of a change input.

FIGS. 6A and 6B are diagrams schematically showing an image representing determination results and an event of a change input. An image Ia3 shown in an upper part of FIG. 6A is an image obtained by adding determination results based on the initially set threshold Th1 to the original analysis target image Ia by hatching. The shade of each cell region Rc in FIG. 6A represents the staining density of the corresponding cell. Further, FIG. 6B shows the staining densities of the respective cells C1 to C12 in the form of a graph, and the staining densities of those cells are the same as those shown in FIG. 5B.

Out of the respective cell regions Rc, the hatched one indicates that the cell corresponding to this cell region was determined to be positive. Hatching representing positive determination is applied to the cell regions corresponding to the cells C1 to C3, C6, C8, C10 and C11 having the staining density higher than the threshold Th1. On the other hand, the cell region, which is not hatched, indicates that the cell was determined to be negative. As can be understood from FIG. 6A, the cells determined to be negative include the cells affected by the staining to a certain extent, but having a density lower than the threshold, in addition to the cells not stained at all or hardly stained.

The image displayed in Step S207 may be an image obtained by superimposing and adding information representing the determination results on the original analysis target image Ia as illustrated here or may be an image showing only the determination results. In this, the unprocessed analysis target image Ia and the image Ia3 representing the determination results are more preferably displayed side by side to facilitate the user's observation. Further, the displayed image may be such an image that the unprocessed analysis target image Ia and the image Ia3 obtained by superimposing the determination results on the analysis target image Ia are placed side by side.

The user can perform a change input of the determination result for the image having the positive/negative determination result added to each cell region in this way. Specifically, the user can designate the cell whose determination result is desired to be changed, using a pointer or marker denoted by 61 in FIG. 6A in a screen. Here, the cell region corresponding to the cell C7 is designated. By performing an operation such as the click of the mouse in this state, the user can express an intention to change the determination.

If the designated cell was determined to be negative, the determination result is changed to positive. A lower part of FIG. 6A shows an example Ia4 of the image after the change input, and the cell C7 designated by the user is newly hatched. This indicates that the determination result was changed from negative to positive. Conversely, if the designated cell was determined to be positive, the determination is changed to negative. In this case, hatching is removed in the image Ia4 after the change. In this way, the user can successively select the cells desired to be changed and change the determinations.

Such a changing operation by the user can be considered as a teaching input of the user as to whether or not the determination result is proper. That is, for the cell whose determination was changed, it can be said that erroneous determination of the determination result was taught by the user. On the other hand, for the unchanged cell, it can be said that the user taught that the automatic determination result was correct. However, all the determination results after the change input are not necessarily correct. This is because of a possibility that the user overlooked erroneous determination or the change of the user itself was a mistake. Further, in principle, it is, in effect, impossible to properly determine the stained states of all the cells only by a single threshold. From this, the resetting of the threshold is preferably performed, assuming the results of the changing operations by the user, including the unchanged determination results, as "prima facie correct answers".

In this sense, the threshold after resetting needs not give determination results completely matching the determination results after a change was made by the user. That is, the threshold may be so adjusted that the result of redetermination based on the new threshold comes closest to the determination result after the change by the user. Specifically, a divergence between the determination result obtained when the determination is made based on the reset threshold and the determination result after the change by the user only has to be smaller than a divergence between the previous determination result given with the threshold temporarily set and the determination result after the change by the user. In this way, the determination result based on the threshold can be made closer to the subjectivity of the user.

For example, the threshold is changed to decrease if the number of the cells changed from "negative to positive" is significantly larger than the number of the cells changed from "positive to negative", whereas the threshold is changed to increase in the opposite case. By doing so, the teaching by the user can be reflected on the threshold.

Various methods can be used for the calculation of the threshold. For example, the staining densities of the cells whose determinations were changed by the user are statistically processed and, for example, an average value or median value can be set as a new threshold. In this case, the values of the staining densities of the cells changed from "negative to positive" and those of the staining densities of the cells changed from "positive to negative" can be distinctively handled. For example, the respective values may be differently weighted and used for calculation.

Further, calculation may be performed, taking into account the values of the staining densities of the cells whose determination results were not changed. In this case, the staining densities of all the cells may be used or only the staining densities of some cells having the staining densities close to the threshold may be used. In this way, the numerical values of the cells whose determination results were not changed can also be reflected on calculation. By doing so, without largely changing the determination results clearly regarded as correct in the present state, an influential range of the threshold change can be limited only to the cells having the staining densities close to the threshold and requiring fine adjustments of the determination results.

Further, various automatic calculation methods to divide a region into two in a distribution indicated by the staining density of each cell can be applied. For example, it is possible to apply the aforementioned Otsu's method, discriminate analysis method, a multivariate analysis such as a support vector machine (SVM) or a calculation method using machine learning algorithm. In the case of the machine learning method, it is also possible to apply fine tuning to perform additional learning using data changed by the user from an already learned state.

By such a recalculation, the threshold is changed from the initial value Th1 to a value Th3 as shown in FIG. 6B. This value Th3 is a threshold for newly determining the cell C7 as positive. Here, the threshold is set to a value higher than the staining density of the cell C12 and lower than the staining density of the cell C7 to handle the cell C7, which was originally determined as negative, as positive and, on the other hand, maintain the determination result for the cell C12, whose determination as negative was not changed. If the determination was changed also for the cell C12, the threshold is a value lower than the staining density of the cell C12. Conversely, for example, if the positive determination of the cell C10 was changed to negative, the threshold is changed to determine the cell C10 as negative, i.e. changed to a larger value.

After the resetting of the threshold, the results of the redetermination based on the new threshold are displayed (Steps S207, S208). At this time, for the cell region having a result different from that of the previous determination, visual information different from the other cell regions is preferably given to facilitate the finding. For example, it is possible to enhance the contour of this cell region, blink this cell region or temporally alternately display the previous determination result and the new determination result. In this way, the cell whose determination was changed can be easily found by the user. An image representing the previous determination results and an image representing the new determination results may be displayed side by side.

Further, in an operation of confirming and correcting the determination results for the individual cells, an image to be displayed preferably has a high magnification. On the other hand, to generally confirm the entire determination results, an image having a lower magnification is preferable. Accordingly, a high-magnification image and a low-magnification image, in each of which the determination results are superimposed, may be selectively or simultaneously displayed. In this case, preferably, the visual field of the low-magnification image includes the entire visual field of the high-magnification image, in other words, the high-magnification image is an image obtained by enlarging a part of the low-magnification image.

The method for determining the threshold corresponding to the staining from the specimen image for one type of staining has been described above to facilitate the understanding of the principle of the threshold determination process. In this case, the user has to judge whether or not the determination result is proper only from the position of a stained (or unstained) part in the specimen image and the density thereof. Thus, depending on the type and state of the staining, judgment may be possibly not easy even for a skilled person. As described next, a threshold determining operation can be more efficiently performed in an actual process by combining and presenting a plurality of staining results.

Figure 7A:
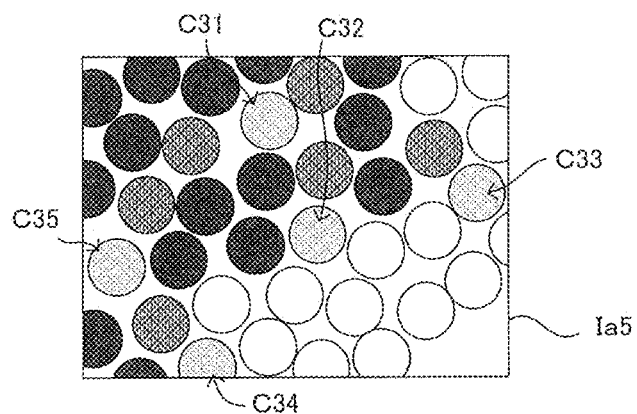
FIG. 7A is a diagram showing the principle of the threshold determination process in which a plurality of specimen images are combined.
Figure 7B:
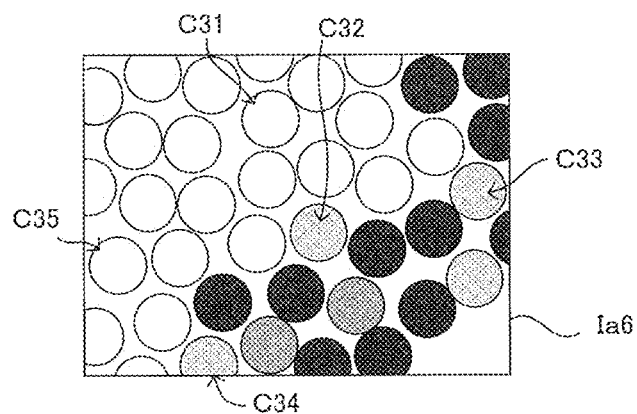
FIG. 7B is a diagram showing the principle of the threshold determination process in which a plurality of specimen images are combined.

FIGS. 7A to 7C are diagrams showing the principle of the threshold determination process in which a plurality of specimen images are combined. FIGS. 7A and 7B show images obtained by staining the same specimen by two mutually different types of staining and imaging the stained specimen. In the following description, the staining method corresponding to FIG. 7A is referred to as "staining A" and that corresponding to FIG. 7B is referred to as "staining B".

For the purpose of determining the threshold, these two types of staining preferably do not stain the same cells. That is, it is assumed that the same cells are not made positive by both the staining A and the staining B. Many are known as such a combination. For example, proteins CD3, CD4, CD8 and the like known to be expressed in T cells are not expressed in B cells. Conversely, proteins CD20, CD79a and the like known to be expressed in B cells are not expressed in T cells.

By combining specimen images obtained by the staining methods in such a relationship, it is possible to make a judgment, taking into account determination results for the other staining method, as to whether or not determination results for one staining method are proper. For example, in the case of combining the types of staining not expressed in the same cells, a possibility that at least either one of the determination results is improper can be said to be high for the cell determined to be positive by either type of staining. Conversely, if only the cell stained by one type of staining is determined to be positive in a combination of the types of staining, which should be expressed in the same cell, at least either one of determination results can be thought to be improper. Such a combination has a possibility of facilitating the finding of artifacts.

Specific contents of the threshold determination method embodying this technical idea are described below. In an image Ia5 shown in FIG. 7A, cells stained at various densities by the staining A are distributed mainly in a left-upper side of FIG. 7A. On the other hand, in an image Ia6 shown in FIG. 7B, cells stained by the staining B are distributed mainly in a right-lower side of FIG. 7B. As described above, it is assumed that both the staining A and the staining B are not expressed in one cell. An image obtained by superimposing and displaying results of determination of the stained states performed with an appropriate threshold temporarily set for each of the staining A and the staining B is an image Ia7 shown in an upper part of FIG. 7C.

In this image Ia7, the cells stained at the staining densities equal to or higher than the threshold in each of the image Ia5 corresponding to the staining A and the image Ia6 corresponding to the staining B are determined to be positive. However, the cells C32 to C34 are determined to be positive by both the staining A and the staining B. Further, the cells C31, C35 are judged to be negative although having a certain staining density in the image Ia5. Such a result mismatch is thought as an artifact due to improper setting of the thresholds.

By teaching such a mismatch from the user, whereby the threshold can be readjusted. That is, the user confirms the determination result and, if a correction is judged to be necessary, the user can designate that cell and teach a correction determination. Specifically, for example, as shown as an image Ia8 after correction in a lower part of FIG. 7C, the determinations for the cells C31, C35 are changed from negative to positive and, for the cells C32 to C34 determined to be positive by both the staining A and the staining B, either one of the determinations can be changed based on the stained states, comparison with the surrounding cells and the like. In this example, the determination by the staining B is changed from positive to negative for the cell C32, and the determination by the staining A is changed from negative to positive for the cells C33, C34. In this way, the mismatch in the determination results with the temporarily set threshold can be solved.

Confirming and correcting operations are desirably comprehensively performed by the user who is viewing the images Ia5, Ia6 showing the staining results and the image Ia7 combining the individual determination results. In this sense, the images Ia5 to Ia7 are preferably displayed side by side on the same screen. Alternatively, at least two of these images Ia5 to Ia7 may be superimposed and displayed. The user can judge which cell needs to be corrected based on a degree of staining of each cell, comparison with the surrounding cells and the like while viewing the displayed screen.

For the staining method whose determination results were changed, the threshold for this staining is recalculated and a new threshold is set. A specific method for that is as described above. Unless the determination was not changed, the current threshold can be determined as an optimal value for this staining. Note that, although the determinations can be changed for either one of the staining A and the staining B here, it may be designed to make the determinations changeable only for one type of staining. For example, with the threshold already optimized for the staining A, it is not preferable to change the determination results of the staining A to determine the threshold for the staining B. In this case, changes can be prohibited for the staining A.

Figure 8A:
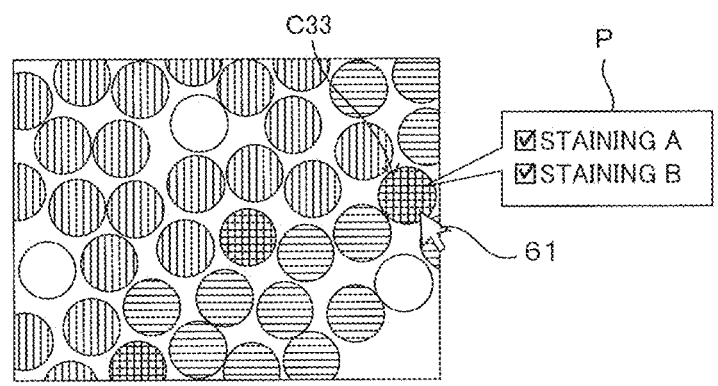
FIG. 8A is a diagram showing examples of an interface screen when a plurality of determination results are combined.
Figure 8B:
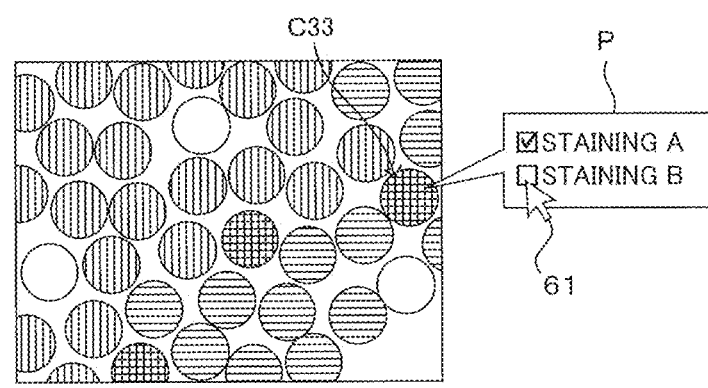
FIG. 8B is a diagram showing examples of an interface screen when a plurality of determination results are combined.

FIGS. 8A and 8B are diagrams showing examples of an interface screen when a plurality of determination results are combined and a change input is received. If the cell, for which the user desires to check the determination result, is designated by the pointer 61 by a mouse operation or the like as shown in FIG. 8A, the determination result in this cell is pop-up displayed. In this example, the cell C33 is designated, and check boxes of both the staining A and the staining B are checked on a pop-up window P. This means that the determination result was positive in each of the staining A and the staining B.

The user can perform an operation input to the effect of changing the determination from positive to negative by unchecking the staining for which the determination is desired to be changed as shown in FIG. 8B. Conversely, in the case of a change from negative to positive, the corresponding staining may be newly checked. Even in the case of combining three or more types of staining, those determination results can be displayed on a pop-up window and similarly changed.

Note that one example is described above and a user interface for the change input is not limited to this. For example, as described above, if the determination results are combined and displayed, but the change input is received only for the staining B, the determination may be changed if the cell region corresponding to this cell is clicked as in the previous example.

Next, a modification of the threshold determination process is described. In this embodiment, one threshold is set for the rectangular analysis target region Ra selected from the specimen image Is by the user. However, if a plurality of mutually different structures are included in the tissue in the analysis target region, the staining density may be different even in the same type of cells. This corresponds, for example, to a case where a tissue is divided into a cortex and a medulla.

In such a case, even if a single threshold is set for the entire analysis target region Ra, it may not be possible to satisfactorily analyze the entire region. Therefore, if a plurality of structures are included as just described, it is desirable to further divide one analysis target region Ra into small regions and set a threshold for each small region.

The analysis target region can be, for example, divided as follows. Various region division methods can be used as a method for automatic division by an image processing. For example, an image in the analysis target region can be smoothened by low-pass filtering and the image can be divided into a plurality of regions based on density differences. A method for extracting a region, in which stained cells are present at a high density, from an image of a specimen having a protein expressed in cells known to be present in a specific region stained and dividing the specimen image into the extracted region and the other region is thought as a specific method.

Further, an operation input on region designation from the user may be received, and division may be performed according to the operation input. A skilled user can distinguish structural differences from the shapes and array of the cells, for example, using an image in which cell nuclei are stained. For example, the region can be designated by drawing a free curve in an image of the analysis target region displayed on the screen.

Further, although the analysis target region Ra is selected by the user in the above embodiment, the analysis target region Ra may be automatically determined from the specimen image Is. For example, the specimen image Is may be automatically divided into several blocks of the same size, a priority order may be provided for those block images, and the block images may be successively presented as the analysis target region Ra. In this case, it is effective in reducing the influence of artifacts to preferentially set the block possibly including many artifacts as the analysis target region.

For example, in the block having a similar distribution of the cells determined to be positive between two types of staining, i.e. having many overlaps of distribution ranges, a processing of adjusting each threshold while referring to the mutual staining results is expected to effectively function. Thus, it is preferable to preferentially optimize the threshold in such a block. Further, contrary to this, if there are a few overlaps of the distributions of the cells determined to be positive between the two types of staining, there is a high possibility that this block includes boundaries abutting different cells or structures. Thus, this block can be said to be suitable for adjusting the threshold.

As described above, in the above embodiment, the tissue specimen S corresponds to a "specimen" of the invention, and the specimen image Is and the analysis target image Ia obtained by imaging the tissue specimen S respectively correspond to an "original image" and an "imaged to be processed" of the invention. Further, the images shown in FIGS. 5C and 6A, for example, correspond to a "result image" of the invention.

Further, in the threshold determination process (FIG. 3) of the above embodiment, Steps S201 to S203 correspond to a "region specification step" of the invention and Steps S205 to S206 correspond to a "determination step" of the invention. Further, Steps S207 to S211 correspond to a "receiving step" of the invention and Step S212 corresponds to a "resetting step" of the invention. Further, Step S207 performed after the execution of Step S212 corresponds to a "re-display step" of the invention.

Note that the invention is not limited to the embodiment described above and various changes other than the aforementioned ones can be made without departing from the gist of the invention. For example, in the above embodiment, the threshold corresponding to each type of staining can be efficiently optimized by combining results of two types of staining not expressed in the same cells. However, a combination of a plurality of types of staining results is arbitrary without being limited to this. For example, a specimen image obtained using a staining method capable of satisfactorily staining specific cells and biological substances such as nuclear staining effectively functions as a comparison object with a specimen image obtained by another staining method. Therefore, it is rational to optimize a threshold in another image by combining such an image with the other image.

Further, the threshold determination process of the above embodiment is a process for optimizing the threshold of each of the staining A and the staining B, using the specimen images and the determination results for the staining A and the staining B. That is, the staining A and the staining B are equally handled. However, a priority order may be provided for a plurality of types of staining and thresholds may be successively optimized according to that priority order. For example, an optimal threshold can be determined for staining functioning as a basis in setting a threshold in another type of staining, and a threshold of the other staining can be optimized using that result. In this way, an optimization result can be stabilized.

For example, if the staining A serves as a basis, a method can be adopted which optimizes the threshold for the staining A, taking into account results of the staining B, staining C and the like and optimizes a threshold for another type of staining on the basis of the optimized threshold. Note that there may be a plurality of types of staining serving as a basis.

Further, the user interface shown in the above embodiment is an example. The method for presenting the determination results to the user and the method for receiving an operation input from the user are not limited to the above ones and arbitrary methods can be used.

As the specific embodiment has been illustrated and described above, a result image obtained by superimposing information representing determination results on an image to be processed may be displayed, for example, in the receiving step in the threshold determination method according to the invention. According to such a configuration, a screen enabling the user to easily check the results and perform an operation input can be presented, and the threshold can be efficiently determined. In this case, the image to be processed and the result image may be displayed on the same screen. By displaying the unprocessed image to be processed together with the determination results, the user can constantly check contents of the original image.

Further, for example, a biological specimen may be multiple immunohistostained. In this case, in the receiving step, determination results in a plurality of types of immunohistostaining may be displayed. According to such a configuration, the user can check the results by comparing and weighing the results against other staining results and determination results. Thus, an operation can be more efficiently performed as compared to the case where only determination results in a single type of staining are presented.

In this case, a stained state may be determined for each of the plurality of types of immunohistostaining in the determination step, an operation input is received for each of the plurality of types of immunohistostaining in the receiving step, and the threshold may be reset for each of the plurality of types of immunohistostaining in the resetting step. According to such a configuration, the thresholds for a plurality of types of staining can be optimized in parallel.

Alternatively, for example, if a biological specimen is multiple immunohistostained, the determination step, the receiving step and the resetting step may be performed for each of the plurality of types of immunohistostaining. This corresponds to a process for determining thresholds successively one by one for a plurality of types of staining, for example. According to such a configuration, an operation can be made more efficient by optimizing the thresholds from the staining having a highest priority, out of the plurality of types of staining.

Further, in the threshold determination method according to the invention, the threshold is preferably reset such that a divergence between the determination result obtained by performing the determination step based on the reset threshold and the determination result after the change based on the operation input is smaller than a divergence between the determination result in the previous determination step performed based on the temporarily set threshold and the determination result after the change based on the operation input. According to such a configuration, the determination result close to the subjective judgment of the user can be obtained by resetting the threshold.

Further, for example, the image to be processed may be divided into a plurality of regions and thresholds may be individually set for the plurality of regions. Even the same cell may possibly have different stained states in some cases, such as depending on a state of the surrounding tissue, specific structures formed and the like. By setting the threshold for each of the plurality of divided regions of the image to be processed, a proper determination can be made regardless of such differences in the stained state.

Further, for example, the image to be processed is a partial region cut out from the original image obtained by imaging the biological specimen, and the threshold may be individually set for each of a plurality of images to be processed having mutually different positions in the original image. Even among such images to be processed, differences in the stained state as described above possibly occur. Therefore, similar effects can be obtained by individually setting the threshold for each of the images to be processed.

Further, for example, a result display step may be provided in which the determination step is performed based on the reset threshold and a new determination result is displayed. According to such a configuration, the user can verify an adjustment result by presenting the determination results based on the reset threshold to the user.

Further, for example, the determination step, the receiving step and the resetting step may be performed again based on the reset threshold. According to such a configuration, by repeating the resetting and verification of the threshold and the readjustment of the threshold based on that, the threshold can be made closer to an optimal value.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

INDUSTRIAL APPLICABILITY

This invention is applicable to the determination of a stained state based on an image obtained by imaging an immunohistostained tissue specimen in the research fields of medicine and biology. Particularly, this invention is suitable for application of analyzing a multiple immunostained specimen in single cells.

REFERENCE SIGNS LIST

C1-C12, C31-C35 cell
Ia analysis target image (image to be processed)
Is specimen image (original image)
Ra region to be analyzed
Rc cell region
S specimen
S201-S203 region specification step
S205-S206 a determination step
S207-S211 a receiving step, result display step
S212 reset step

The invention claimed is:

1. A threshold determination method for evaluating a stained biological specimen, the threshold determination method comprising:
 a region specification step of specifying cell regions corresponding to individual cells in an image to be processed which is obtained by imaging the biological specimen;

a determination step of setting temporarily a threshold for a staining density which quantitatively indicates how densely the cell region is stained, comparing the staining density and the threshold for each of the cell regions and determining whether a stained state is positive or negative for staining;

a receiving step of displaying a determination result of the stained state of each of the cell regions and receiving an operation input of a user to change the determination result for each cell region; and a resetting step of resetting the threshold in accordance with the determination result after change.

2. The threshold determination method according to claim 1, wherein in the receiving step, a result image obtained by superimposing information representing determination results on an image to be processed is displayed.

3. The threshold determination method according to claim 2, wherein the image to be processed and the result image are displayed on a same screen.

4. The threshold determination method according to claim 1, wherein the biological specimen is multiple immunohistostained and in the receiving step, the determination results in a plurality of types of immunohistostaining is displayed.

5. The threshold determination method according to claim 1, wherein the stained state is determined for each of a plurality of types of immunohistostaining in the determination step, the operation input is received for each of the plurality of types of immunohistostaining in the receiving step, and the threshold is reset for each of the plurality of types of immunohistostaining in the resetting step.

6. The threshold determination method according to claim 1, wherein the biological specimen is multiple immunohistostained and the determination step, the receiving step and the resetting step are performed for each of a plurality of types of immunohistostaining.

7. The threshold determination method according to claim 1, wherein in the resetting step, the threshold is reset such that a divergence between the determination result obtained by performing the determination step based on a reset threshold and the determination result after the change based on the operation input is smaller than a divergence between the determination result in the previous determination step performed based on the threshold temporarily set and the determination result after the change based on the operation input.

8. The threshold determination method according to claim 1, wherein the image to be processed is divided into a plurality of regions and thresholds are individually set for the plurality of regions.

9. The threshold determination method according to claim 1, wherein the image to be processed is a partial region cut out from an original image obtained by imaging the biological specimen, and the thresholds are individually set for each of a plurality of images to be processed having mutually different positions in the original image.

10. The threshold determination method according to claim 1, further comprising a result display step of displaying a new determination result obtained by performing the determination step based on the threshold which is reset.

11. The threshold determination method according to claim 1, wherein the determination step, the receiving step and the resetting step are performed again based on the threshold which is reset.

* * * * *